United States Patent [19]

Warner et al.

[11] Patent Number: 5,446,938
[45] Date of Patent: Sep. 5, 1995

[54] BAG CONSTRUCTION FOR A DOCKLEVELER

[75] Inventors: Robert J. Warner, Mukwonago, Wis.; Charles H. Hodges, Ruxton, Md.; Donald A. Wagner, Wauwatosa, Wis.

[73] Assignee: Kelley Company Inc., Milwaukee, Wis.

[21] Appl. No.: 131,981

[22] Filed: Oct. 4, 1993

[51] Int. Cl.⁶ .............................. E01D 1/00
[52] U.S. Cl. ........................ 14/71.3; 254/93 HP
[58] Field of Search .............. 14/69.5, 71.1, 71.3, 14/71.7; 254/88, 93 HP

[56] References Cited

U.S. PATENT DOCUMENTS

| | | |
|---|---|---|
| 2,495,092 | 1/1950 | Cox et al. |
| 2,610,824 | 9/1952 | Grier ............................ 254/93 HP |
| 2,804,118 | 8/1957 | Bayerhohler |
| 3,211,425 | 10/1965 | Greulich et al. |
| 3,521,861 | 7/1970 | Freudenthal et al. |
| 3,528,118 | 9/1970 | Smith |
| 3,659,899 | 5/1972 | Phillips et al. ................. 298/22 R |
| 3,711,157 | 1/1973 | Smock ............................ 298/8 R |
| 4,081,874 | 4/1978 | Artzberger ....................... 14/71.7 |
| 4,293,969 | 10/1981 | Frommelt ........................ 14/71.1 |
| 4,572,579 | 2/1986 | Saito ............................. 298/1 A |
| 4,688,760 | 8/1987 | Garman et al. ................. 254/93 HP |
| 4,786,032 | 11/1988 | Garman et al. ................. 254/93 HP |
| 4,955,923 | 9/1990 | Hageman ....................... 14/71.7 |
| 5,042,103 | 8/1991 | Megens ......................... 14/71.7 |

FOREIGN PATENT DOCUMENTS

| | | |
|---|---|---|
| 2354388 | 10/1973 | Germany . |
| 3743551 | 7/1989 | Germany ..................... 254/93 HP |
| 835142 | 5/1960 | United Kingdom . |
| 2206158 | 12/1988 | United Kingdom ........... 254/93 HP |
| 161243 | 7/1964 | U.S.S.R. . |
| 13267 | 7/1993 | WIPO ............................. 14/69.5 |

Primary Examiner—David J. Bagnell
Assistant Examiner—James A. Lisehora
Attorney, Agent, or Firm—Michael, Best & Friedrich

[57] ABSTRACT

An inflatable bag assembly for a dock leveler including a stack of superimposed bags which are joined together along contiguous surfaces. The interiors of the bags are connected to a suitable source of low pressure gas such as air. The stack of superimposed bags is positioned between a supporting surface on a loading dock and a ramp which is hinged to the dock and is movable between a horizontal position and an upwardly inclined position. By supplying air to the bag assembly, the bag assembly is inflated thereby moving the ramp from the horizontal to the upwardly inclined position.

6 Claims, 2 Drawing Sheets

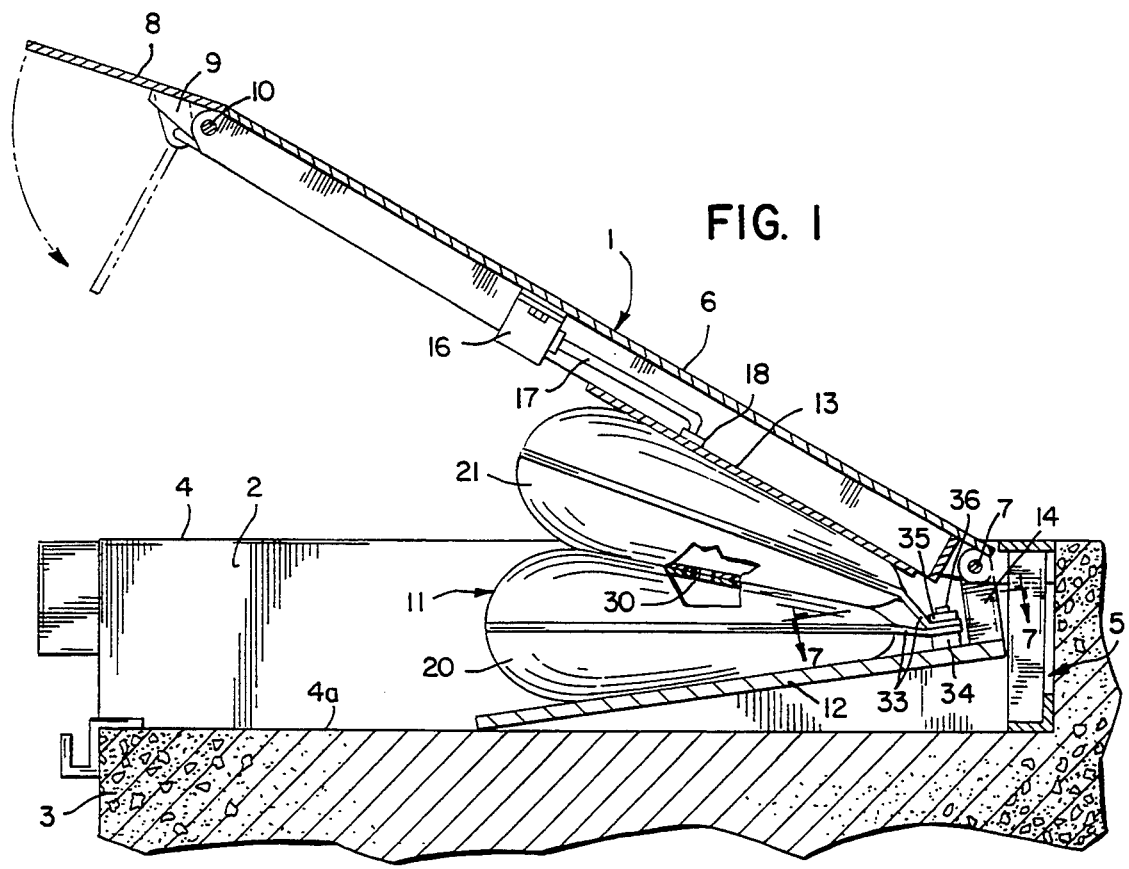
FIG. 1
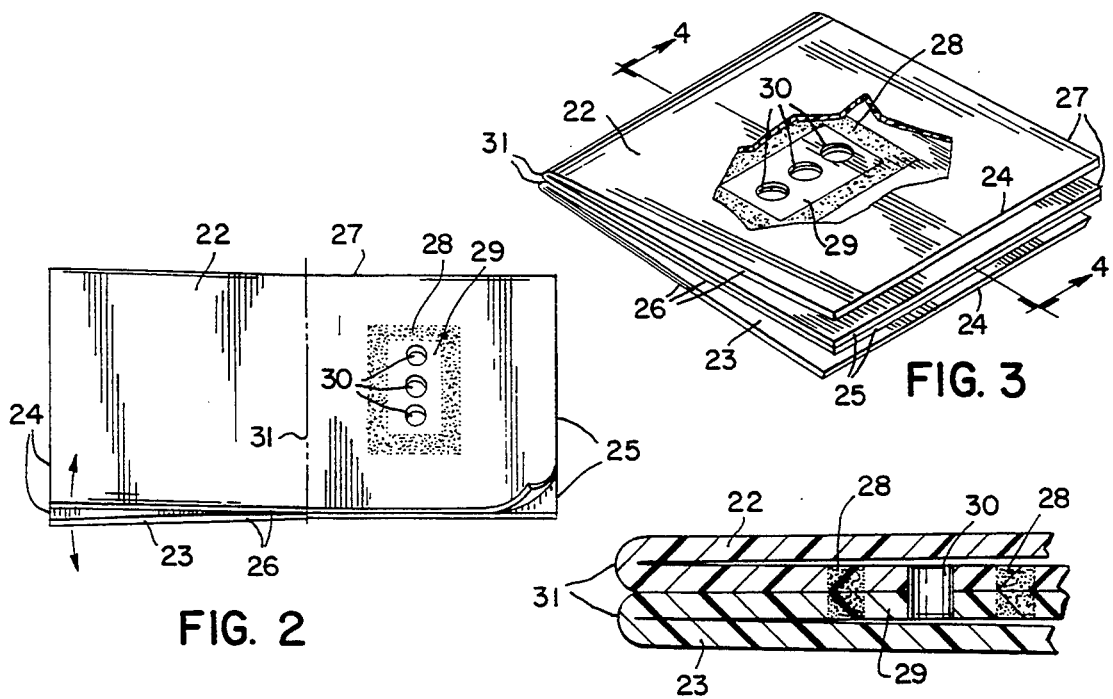
FIG. 2
FIG. 3
FIG. 4

BAG CONSTRUCTION FOR A DOCKLEVELER

BACKGROUND OF THE INVENTION

Dock levelers or dock boards are commonly used on loading docks to span the gap between the loading dock and the bed of a truck or other carrier parked in front of the dock to enable material handling equipment to conveniently pass between the dock and the truck bed.

The typical dock leveler is mounted within a pit or depression in the loading dock and includes a ramp or deck plate which is hinged at its rear edge to the dock and is movable between a horizontal position, where the ramp is substantially flush with the upper surface of the dock, to an upwardly inclined position.

Hinged to the forward edge of the ramp is a lip that can be moved from a downwardly hanging pendant position to an extended position where the lip forms an extension to the ramp.

After a truck has backed to the loading dock, the ramp is elevated to the upwardly inclined position, while the lip is pendant. The ramp is then lowered and the lip is moved to its extended position and held in that position so that the extended lip will then engage the truck bed as the ramp is lowered back toward the horizontal position. With the lip in engagement with the truck bed, material handling equipment, such as a fork lift truck, can move freely between the dock and the truck bed. After the loading operation is completed and the truck pulls away from the dock, the lip will fall by gravity back to the pendant position.

In the typical dock leveler, the ramp is elevated either by mechanical or hydraulic means. In a mechanically operated dock board, one or more extension springs are mounted in the pit beneath the ramp and are connected to the rear end of the ramp through a lever arm. The force of the springs will pivot the ramp to the upwardly inclined position. The counter balancing springs are designed such that an operator walking outwardly on the ramp, will overcome the force of the springs so that the ramp can be walked down to enable the extended lip to engage the bed of the truck.

In a hydraulically operated dock board, the ramp is moved to its elevated position by actuation of a hydraulic cylinder and by discontinuing operation of the pump in the hydraulic system, pressure in the system will be released so that the ramp will descend, enabling the extended lip to engage the truck bed.

It has also been proposed, as described in U.S. patent application Ser. No. 07/814,002, filed Dec. 26, 1991, now abandoned, to elevate the ramp to the inclined position through use of an inflatable bag. As described in that patent application, a bag is mounted in the pit beneath the ramp with the lower end of the bag engaging the pit floor or supporting frame of the dock leveler while the upper end of the bag is engaged with the undersurface of the ramp. By introducing low pressure air into the bag, the bag will expand, thereby moving the ramp to the upwardly inclined position.

SUMMARY OF THE INVENTION

The invention is directed to an improved inflatable bag assembly for a dock leveler, having particular use in pivoting the ramp of the dock leveler from the generally horizontal position to an upwardly inclined position.

In accordance with the invention, the bag assembly includes a plurality of superimposed bags, each bag being generally pillow-shaped in the inflated condition. The bags have contiguous surfaces which are preferably sealed together throughout a generally annular area bordering a central unsealed area. Ports or apertures extend through the contiguous surfaces of adjacent bags in the central unsealed area to establish communication between the bags. Low pressure air is introduced into the bags by operation of a fan or blower which can be mounted beneath the ramp of the dock leveler and is connected to one of the bags through a suitable air line.

By supplying air or other gas to the bags, the bags will be inflated, causing the ramp to be pivoted upwardly from the horizontal to the upwardly inclined position. By discontinuing operation of the fan, the weight of the ramp will slowly deflate the bags with the air being exhausted through a restriction such as the fan, thereby enabling the ramp to move downwardly and permitting engagement of the extended lip of the dock leveler with the truck bed.

The multi-compartment bag is preferably constructed by initially placing two generally-rectangular sheets of material in superimposed relation with the two sheets having a pair of aligned first or end edges as well as a pair of aligned second or side edges. Portions of the superimposed sheets are then sealed together along an annular area and one or more holes are then formed in the superimposed sheets within the annular sealed area.

Each sheet is then folded along a line parallel to the end edges to bring the end edges of each sheet into alignment and to bring a portion of each side edge of each sheet into overlapping relation with a second portion of each side edge. The overlapping portions of the side edges are then sealed together and subsequently the aligned end edges are sealed along a marginal strip to form a closed bag assembly consisting of two joined and interconnected bags. A suitable fitting is then mounted in one of the bags and is connected to the air line to supply air to the bags.

The bag assembly has a large surface area engaged with the underside of the ramp as well as with the pit floor or frame of the dock leveler so that low pressure air can be used to expand the bag and pivot the ramp to the upwardly inclined position.

The sealed margin of the end edges of each bag provides a means for tethering the bag to the frame of the dock leveler to prevent the bag from moving forwardly as the bag is expanded. The tethering strip is formed integrally with the bag so that no auxiliary or additional tethering straps are required.

The bag has increased stability over a single compartment, accordion-type bag and will move between the deflated and inflated conditions without need of additional confinement beyond the aforementioned tethering.

Each bag in the bag assembly is formed of a single piece of sheet material and this simplifies the handling and manufacturing costs for the bag.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of a dock leveler incorporating the bag assembly of the invention with parts broken away in section;

FIG. 2 is a plan view of a pair of superimposed sheets of material used in forming the bag assembly;

FIG. 3 is perspective view showing the sheets being folded.

FIG. 4 is a cross section of the folded sheets;

DESCRIPTION OF THE ILLUSTRATED EMBODIMENT

Figure 5:
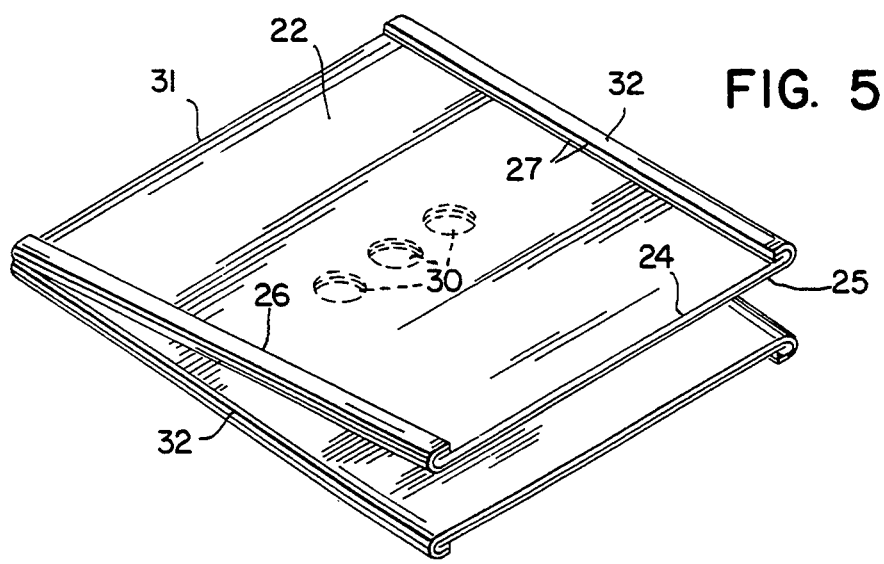
FIG. 5 is a perspective view showing the side edges of the sheets joined together.

The invention is directed to an improved bag assembly or construction to be used with a dock leveler. As shown in FIG. 1, dock leveler 1 is mounted in a pit or depression 2 in a loading dock 3 and is adapted to span the gap between the upper surface 4 of the loading dock and the bed of a truck parked in front of the dock to enable material handling equipment to conveniently pass between the dock and the truck bed.

Dock leveler 1 includes frame or supporting structure 5 which is secured in the rear end of pit 2 and the rear edge of a ramp or deck plate 6 is pivotally connected to frame 5 by hinge pins 7 so that the ramp can be pivoted between a downwardly inclined position, through a horizontal position to an upwardly inclined position.

Hinged to the forward edge of ramp 6 is a lip 8. A series of lip lugs 9 are secured to the under surface of lip 8 and are connected through hinge pins 10 to lugs on the forward edge of ramp 6. Lip 8 is adapted to be moved between a downwardly hanging pendant position, shown by the dashed lines in FIG. 1, and an extended position where the lip forms an extension to the ramp. The manner of moving the lip to the extended position and latching the lip in the extended position is conventional and in itself forms no part of the present invention.

Ramp 6 is intended to be pivoted between the horizontal and the upwardly inclined position by an inflatable bag assembly 11. The lower surface of bag assembly 11 is supported on a frame or plate 12 located in pit 4 while the upper surface of bag assembly 11 is engaged with a plate 13 that is mounted to the under surface of ramp 6. Alternately, the lower surface of bag assembly 11 is supported on the pit floor 4a.

FIG. 1 shows a plurality of arms 14 extending upwardly from the rear end of frame 12 and the upper ends of the arms are pivoted to hinge pins 7.

As described in U.S. patent application Ser. No. 07/814,002, filed Dec. 25, 1991, now abandoned, low pressure air can be supplied to the bag assembly 11 by a fan 16 which is mounted between a pair of beams on the underside of ramp 6. The outlet of fan 16 is connected via an air line 17 to a fitting 18 in bag assembly 11. Through operation of fan 16, air will be supplied to the bag assembly, inflating the bag assembly and thereby pivoting the ramp from the horizontal to the upwardly inclined position.

Bag assembly 11 includes a plurality of vertically superimposed bags 20 and 21 each preferably formed of fabric, such as nylon or polyester, impregnated with a thermoplastic resin. While the drawings show two bags 20 and 21 being used, it is contemplated that two or more bags may be utilized depending upon the size and weight of the ramp and the depth of the pit 2.

FIGS. 2-6 illustrate the preferred manner of constructing the bag assembly 11. As shown in FIG. 2, two generally rectangular sheets 22 and 23 of fabric are positioned in superimposed relation. Each sheet 22, 23 has a pair of opposed first or end edges 24 and 25 and a pair of second or side edges 26 and 27.

Overlapping portions of the two sheets 22 and 23 are sealed together, such as by heat sealing or adhesives, along an annular sealed area or strip 28, with the enclosed zone 29 within the sealed area 28 being free of attachment. While the area 28 is shown as generally rectangular, it is contemplated that the area can have other configurations. The term "annular area", as used in the description and claims, is intended to mean an enclosed area that could be rectangular, circular, oval, polygonal, or the like, in configuration.

One or more holes 30 are formed in the overlapping sheets 22 and 23 in the unsealed enclosed zone 29. Holes 30 can be of any desired size or shape.

After formation of the sealed area 28 and holes 30, each sheet 22, 23 is folded along a fold line 31, as shown in FIG. 3 and 4. In the folded state, end edges 24 and 25 of each sheet are in superimposed alignment and a portion of each side edge 26 and 27 of each sheet is aligned with a second portion of the side edge. The joined areas 28 are thus located centrally of the folded structure as shown in FIGS. 3 and 4.

The overlapping aligned side edges 26 and 27 of both sheets 22 and 23 are then folded on each other and joined together such as by heat sealing or adhesives to form sealed side edges 32, as shown in FIG. 5.

Figure 6:
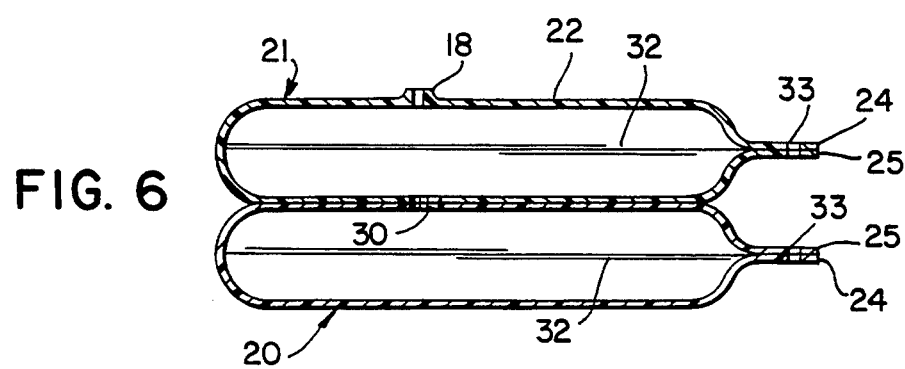
FIG. 6 is a cross section of the completed bag assembly.
Figure 7:
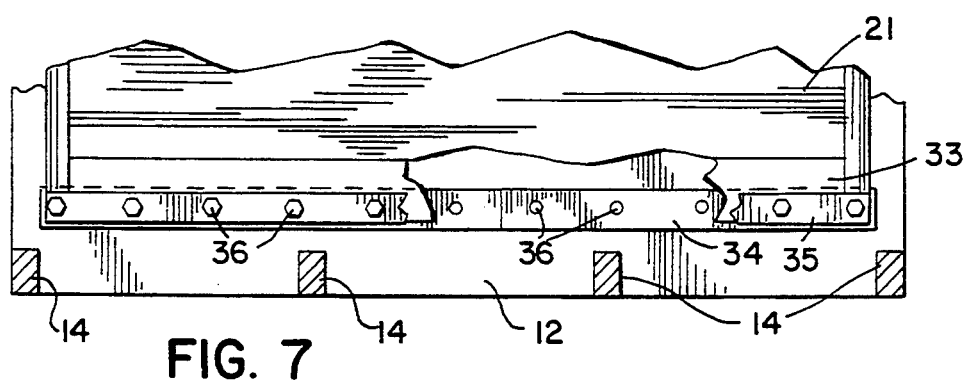
FIG. 7 is a fragmentary section taken along line 7—7 of FIG. 1.

The aligned first or end edges 24 and 25 of each sheet 22 and 23 are then joined together, again by heat sealing or adhesives, to enclose each bag 20 and 21 and provide a sealed margin or flap 33 of substantial width, as seen in FIG. 6. The joined flaps 33 can be used as a tether when the bag is installed in the dock leveler to prevent the bag from moving forward as the bag is expanded and the ramp is elevated. As illustrated in FIG. 1, the flaps 33 of each bag 20 and 21 are secured between a bar 34 attached to the rear edge of frame 12 and a clamping strip 35 by bolts 36 which extend through holes in the flaps 33.

The bags 20 and 21 have large surface areas which are engaged with the undersurface of the ramp 6 and with the pit floor 38 or frame 12 and due to the large contacting surface areas, low pressure air can be used to inflate the bags and pivot the ramp upwardly.

With the preferred method of constructing the bag assembly 11, the tethering flaps 33 are formed integrally with the bags 20 and 21 which eliminates the need for auxiliary tethering straps. As the tethering flaps 33 are directly connected into the folded U-shaped sheet material the flaps can resist substantial force as the ramp is elevated.

The multi-compartment bag of the invention is inherently more stable than a single compartment accordion-type bag so that the bag can be inflated and deflated without the need of a cage or other confinement.

Each bag 20 and 21 is formed of a single piece of material and this substantially reduces the manufacturing cost of the bag as compared to a bag formed of multiple pieces.

While the drawings show the bags 20 and 21 being of substantially the same size and shape, it is contemplated that the bags can have different sizes and shapes. However, the bag of smallest surface area will define the effective lifting area for the bag assembly.

Figure 8:
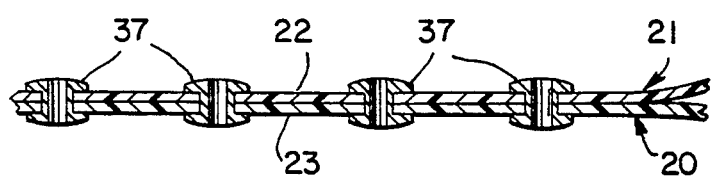
FIG. 8 is a modified form of the invention utilizing a plurality of grommets to interconnect the bags of the bag assembly.

FIG. 8 shows a second embodiment of the invention utilizing a modified construction for interconnecting bags 20 and 21 of bag assembly 11. As shown in FIG. 8, the contiguous surfaces of sheets 22 and 23 are connected together by one or more grommets 37. Grommets 37 replace the sealed area 28 and holes 30 of the first embodiment and serve to interconnect bags 20 and 21, as well as providing communication between the interiors of the bags. The sheets 22 and 23 of FIG. 8 can be folded and sealed in the same manner as described in the first embodiment to provide the enclosed bags 20 and 21.

It is also contemplated that the overlapping sheets 22 and 23 can be merely joined together by adhesive, heat sealing, mechanical fasteners, stitching, or the like, and without communication in the joined area, in which case, external conduits can be used to establish communication between the bags, or a separate air supply line can be connected to each bag.

Various modes of carrying out the invention are contemplated as being within the scope of the following claims, particularly pointing out and distinctly claiming the subject matter which is regarded as the invention.

We claim:

1. A dock leveler, comprising a supporting structure mounted to a loading dock, a ramp having a rear edge hinged to the supporting structure and movable between a generally horizontal position and an upwardly inclined position, bag support means spaced beneath the ramp, a flexible inflatable bag assembly disposed between the ramp and said bag support means, means for inflating said bag assembly to pivot the ramp from the horizontal to the upwardly inclined position, said bag assembly comprising a pair of superimposed bags, each bag composed of a single generally rectangular sheet of flexible material, each sheet having a pair of first generally parallel edges and a pair of second generally parallel edges disposed normal to said first edges, each sheet being folded along a fold line parallel to said first edges so that in the folded state the first edges of each sheet are aligned and a first portion of each second edge of each sheet is aligned with a second portion of that second edge, a pair of said folded sheets being in superimposed relation and having contiguous surfaces, an annular sealed area connecting the contiguous surfaces together and enclosing an unsealed zone, aperture means disposed in said unsealed zone and extending through said contiguous surfaces, first sealing means for sealing the aligned first edges of each sheet together, and second sealing means for sealing the aligned second edge portions of each sheet together to provide a closed bag, said aperture means providing communication between said bags.

2. The dock leveler of claim 1, wherein said first sealing means projects outwardly from the respective bag assembly and provides a tethering flap, and connecting means for connecting the tethering flap to the bag support means.

3. The dock leveler of claim 1, wherein said tethering flap extends the full distance between the second edges of each sheet.

4. The dock leveler of claim 1, wherein said inflating means includes a fitting connected to one of said bags for supplying gas to said bag assembly.

5. The dock leveler of claim 1, wherein said aperture means comprises a grommet.

6. A dock leveler, comprising a supporting structure mounted to a loading dock, a ramp having a rear edge hinged to the supporting structure and movable between a generally horizontal position and an upwardly inclined position, bag support means spaced beneath the ramp, a flexible inflatable bag assembly disposed between the ramp and said bag support means, means for inflating said bag assembly to pivot the ramp from the horizontal to the upwardly inclined position, said bag assembly comprising a pair of superimposed bags, each bag composed of a single generally rectangular sheet of flexible material, each sheet having a pair of first generally parallel edges and a pair of second generally parallel edges disposed normal to said first edges, each sheet being folded along a fold line parallel to said first edges so that in the folded state the first edges of each sheet are aligned and a first portion of each second edge of each sheet is aligned with a second portion of that second edge, a pair of said folded sheets being in superimposed relation and having contiguous surfaces, connecting means for connecting the contiguous surfaces together, first sealing means for sealing the aligned first edges of each sheet together in flatwiswe relation to provide an outwardly extending tethering flap, second sealing means for sealing the aligned second edge portions of each sheet together to provide a closed bag, and connecting means for connecting each tethering flap to a rear portion of said bag support means.

* * * * *